United States Patent
Chakraborty et al.

(10) Patent No.: US 9,355,381 B2
(45) Date of Patent: May 31, 2016

(54) ASSET TRACKING SYSTEM WITH ADJUSTED PING RATE AND PING PERIOD

(71) Applicant: Petari USA, Inc., Boston, MA (US)

(72) Inventors: Mrinmoy Chakraborty, Bangalore (IN); Jamshed Dubash, Shrewsbury, MA (US); Jahangir Nakra, Titusville, NJ (US); Brian Lee, Boston, MA (US)

(73) Assignee: Senaya, Inc., Boston, MA (US)

( * ) Notice: Subject to any disclaimer, the term of this patent is extended or adjusted under 35 U.S.C. 154(b) by 454 days.

(21) Appl. No.: 13/796,574

(22) Filed: Mar. 12, 2013

(65) Prior Publication Data

US 2013/0321211 A1     Dec. 5, 2013

Related U.S. Application Data

(60) Provisional application No. 61/654,358, filed on Jun. 1, 2012.

(51) Int. Cl.
    *G01S 3/02*     (2006.01)
    *G06Q 10/08*     (2012.01)

(52) U.S. Cl.
    CPC .................................. *G06Q 10/087* (2013.01)

(58) Field of Classification Search
    CPC ................................ G01S 3/02; G06Q 10/087
    USPC .................................................. 342/451, 458
    See application file for complete search history.

(56) References Cited

U.S. PATENT DOCUMENTS

| | | |
|---|---|---|
| 5,438,607 A | 8/1995 | Przygoda, Jr. et al. |
| 6,067,044 A | 5/2000 | Whelan et al. |
| 6,373,389 B1 | 4/2002 | Przygoda, Jr. et al. |
| 6,700,493 B1 | 3/2004 | Robinson |
| 6,717,517 B2 | 4/2004 | Przygoda, Jr. |
| 7,026,937 B2 | 4/2006 | Przygoda, Jr. |
| 7,072,668 B2 | 7/2006 | Chou |
| 7,171,187 B2 | 1/2007 | Haave et al. |
| 7,173,529 B2 | 2/2007 | Przygoda, Jr. |
| 7,196,621 B2 | 3/2007 | Kochis |
| 7,218,227 B2 | 5/2007 | Davis et al. |
| 7,265,668 B1 | 9/2007 | Brosius |
| 8,078,139 B2 | 12/2011 | Twitchell, Jr. |
| 8,130,096 B2 | 3/2012 | Monte et al. |
| 8,144,008 B2 | 3/2012 | Furey et al. |
| 8,242,904 B2 | 8/2012 | Brosius |
| 8,260,323 B1 * | 9/2012 | Bronner et al. ............. 455/456.6 |
| 2007/0033170 A1 * | 2/2007 | Sull et al. .......................... 707/3 |
| 2009/0273560 A1 * | 11/2009 | Kalanithi et al. ............. 345/156 |
| 2010/0081411 A1 * | 4/2010 | Montenero ................ 455/404.2 |
| 2011/0140913 A1 * | 6/2011 | Montenero .............. 340/870.07 |

FOREIGN PATENT DOCUMENTS

WO     03/065270     8/2003

* cited by examiner

*Primary Examiner* — Harry Liu
(74) *Attorney, Agent, or Firm* — HolzerIPLaw, PC

(57) ABSTRACT

Asset tracking system that utilizes a time-based ping in which the ping rate and the ping period are based on a predetermined event. Over the period of use of the system and device, the ping rate and ping period are adjusted based on the expected occurrence of an event. The system has lower operational cost, particularly battery maintenance cost, than conventional active ping systems that have a set ping rate or a random ping rate.

19 Claims, 5 Drawing Sheets

ASSET TRACKING SYSTEM WITH ADJUSTED PING RATE AND PING PERIOD

CROSS-REFERENCE TO RELATED APPLICATION

This application claims the benefit of U.S. Provisional Application No. 61/654,358 filed Jun. 1, 2012, the entire contents of which are incorporated herein by reference for all purposes.

FIELD OF THE DISCLOSURE

The present disclosure relates generally to asset tracking devices and systems. Based on the movement and relation of the assets or items in the environment, the system of the disclosure locates the assets in the environment through the use of wireless communication tracking devices.

BACKGROUND

In industry nowadays, success or failure depends in part upon knowing the up-to-date status of various assets. For example, in the freight delivery business, up-to-date knowledge of the location and, in some instances, the environment of various assets, such as pallet goods, is critical to efficient and reliable operations. Failure to maintain up-to-date status information can result in temporarily lost assets, sub-optimal use of the assets, and in the case of freight delivery, missed or late deliveries.

Recently, technologies have been developed that greatly assist in tracking locations of assets. For example, global positioning systems (GPS) use wireless signals transmitted by earth-orbiting satellites to calculate the position of a receiving device. Although relatively expensive, GPS receivers are capable of providing relatively accurate location information for virtually any point in the world.

More recently, radio frequency identification (RF or RFID) systems have been developed in which devices, often referred to as "tags," wirelessly communicate with readers. RF tracking systems are typically used in parcel tracking and sorting, container tracking, luggage tracking, retail tracking, warehouse tracking and inventory operations. The RF tags may be either passive or active. Passive tags absorb signals transmitted by the reader and retransmit their own signals, such as identification information. While passive tags do not require a local power source, their resulting transmit range is relatively short, typically less than 1-2 meters. In contrast, active tags, which send a signal to indicate its location, include a local energy source (such as a battery) that improves transmission range. Depending on the wireless signal system used by the device, the range may be on the order of several meters or several hundred meters. Regardless of the types of tags used, knowledge of the fixed location of the reader devices allows users to identify the location of assets that have tags attached thereto.

Active tag systems are preferred for some applications due to their long range transmission range. Unfortunately, the position signal or "ping" drains battery life of the transmitter, thus resulting in added operational cost of the system.

Obtaining increased system value and decreased operational cost are key business and technical goals for designers of tracking systems. Increasing the value per ping, by decreasing the cost per ping, is one mechanism to decrease the operational cost of active systems. In an exception based asset management environment, the value per ping is the lowest under normal conditions. Merely increasing the period between subsequent pings, however, although it may decrease the cost per ping, does not intelligently decrease the cost per ping, as the extended period may miss critical movement of the tagged asset.

SUMMARY

The value per ping is highest when the ping captures a business critical event in the field. The present disclosure provides an active RF tracking system in which the value per ping is increased (preferably optimized) by adjusting the ping rate under different business conditions. In this disclosure, the ping rate, ping occurrence, and ping period (time period of multiple sequential pings) is based on a predetermined probably of motion of the tagged asset at the ping occurrence and/or probability of a desired event at the ping occurrence.

In one particular embodiment, this disclosure provides a wireless tracking system that includes a transmitter comprising a battery, a GPS positioning element, a two-way communication module, and memory, and a receiver. The transmitter is configured to send data regarding the location of the transmitter to the receiver, and the receiver is configured to receive the data from the transmitter. The system also includes a route exception database comprising a plurality of exception events. The transmitter is configured to modify a ping rate and a ping period at which the data is sent by the transmitter dependent on an exception event from the database. When the transmitter is located within a predetermined distance of the location of an exception event, the ping rate is increased, and the ping period may be decreased.

In another particular embodiment, this disclosure provides a method for tracking an asset. The method includes setting an initial ping rate, determining a location of the asset, checking a route exception database for an exception event within a predetermined distance of the location, increasing the initial ping rate to a new ping rate if the exception event is within the predetermined distance of the location, and transmitting a plurality of pings at the new ping rate. Optionally, the method further includes setting an initial ping period, decreasing that initial ping period to a new ping period if the exception event is within the predetermined distance of the location, and transmitting a plurality of pings for the new ping period. In some embodiments, the initial ping rate is increased by a multiple to obtain the new ping rate and the initial ping period is decreased by the same multiple to obtain the new ping period.

Disadvantages of prior wireless data fetching systems (e.g., tracking systems) include having non-value added pings, which thus cause faster battery drainage, and having timed or scheduled pings unrelated to practical events (e.g., business logic or exception events), which thus reduce the value per ping. The system of the present disclosure increases value per ping, provides a longer battery life for the battery-powered tracking device, and decreases operational cost, particularly battery maintenance cost.

These and various other features and advantages will be apparent from a reading of the following detailed description.

BRIEF DESCRIPTION OF THE DRAWING

The disclosure may be more completely understood in consideration of the following detailed description of various embodiments of the disclosure in connection with the accompanying drawing, in which.

DISCUSSION OF THE INVENTION

Figure 1:
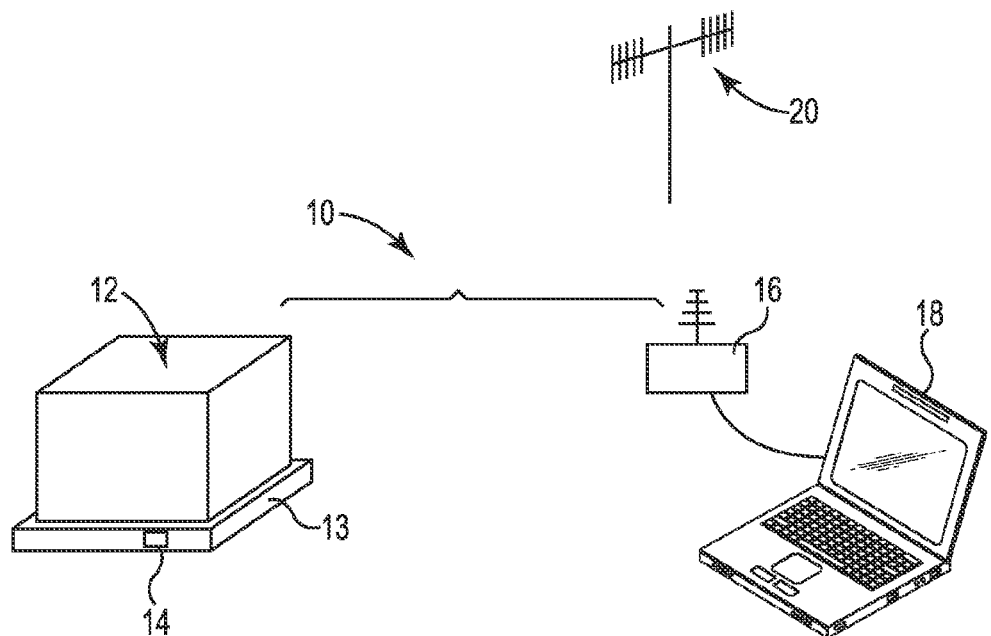
FIG. 1 is a perspective view of components of a tracking system according to this disclosure.

Assets and products (e.g., items, objects or people) move through different paths, such as manufacturing processes and supply chains during the course of their lifetime. There is a desire to track these assets, in some embodiments, because of their value or, in other embodiments, for business justification purposes. A tracking device or system therefore is highly beneficial for solving the dilemma of knowing the physical location of the asset at a set point in time.

The present disclosure is directed to a wireless, active, RF tracking system that increases value per ping, provides a longer battery life of the battery-powered device, and decreases operational cost, particularly battery maintenance cost. Disadvantages of prior wireless data fetching systems include having non-value added pings (thus causing faster battery drainage), and having timed or scheduled pings unrelated to business logic or exception events, thus reducing the value per ping.

In the following description, reference is made to the accompanying drawing that forms a part hereof and in which are shown by way of illustration at least one specific embodiment. The following description provides additional specific embodiments. It is to be understood that other embodiments are contemplated and may be made without departing from the scope or spirit of the present disclosure. The following detailed description, therefore, is not to be taken in a limiting sense. While the present disclosure is not so limited, an appreciation of various aspects of the disclosure will be gained through a discussion of the examples provided below.

Unless otherwise indicated, all numbers expressing feature sizes, amounts, and physical properties are to be understood as being modified by the term "about" Accordingly, unless indicated to the contrary, the numerical parameters set forth are approximations that can vary depending upon the desired properties sought to be obtained by those skilled in the art utilizing the teachings disclosed herein.

As used herein, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

The tracking devices and systems of this disclosure utilize an intelligent, active ping to increase the value per ping from the transmitter and provide a longer battery life for the battery-powered transmitter. The system utilizes a time-based ping in which the ping rate (e.g., pings per minute, pings per hour) and the ping period (i.e., time for which the ping rate is constant, e.g., minutes or hours), for a specific point in time, are based on a predetermined event. Over the period of use of the system and device, the ping rate and ping period are adjusted based on the expected occurrence of an event. The system has lower operational cost, particularly battery maintenance cost, than conventional active ping systems that have a set ping rate or a random ping rate.

FIG. 1 schematically illustrates a system 10 of the present disclosure. System 10 includes an asset 12 on which is located a transmitter device 14. Transmitter device 14 is an active RF tag, having the capability to actively transmit and/or provide interactive information to a receiver 16, located remote from asset 12 and transmitter device 14. Receiver 16 is operably connected to a computer or display 18. System 10 uses an established wireless communication network 20 to identify the location of transmitter device 14 and convey that information to display 18. Examples of wireless RF communication networks 20 with which system 10 can function include CDMA/GMS, ZigBee, WiFi (sometimes referred to as WLAN), and WiMax.

Transmitter device 14 is secured to asset 12, for example, on pallet 13 on which is loaded goods; in some embodiments, device 14 may be secured to pallet 13 in a manner that does not readily allow removal of device 14 from pallet 13. In some embodiments, transmitter device 14 is embedded into pallet 13, for example, in the center of pallet 13 under its top surface, whereas in other embodiments transmitter device 14 is adhered to pallet 13. Alternately, transmitter device 14 is removably secured to asset 12, for example, on the goods present on pallet 13. In such embodiments, device 14 is preferably on the top surface or on a surface close to the highest point of asset 12. Device 14 is preferably positioned on asset 12 so that no operators, animals, equipment, etc. can access transmitter device 14 during normal movement of asset 12 and remove, damage or otherwise hinder the operation of device 14. Preferably, transmitter device 14 is independently powered and electrically isolated from asset 12 and does not require manual intervention during normal operation of the tracking system 10.

Figure 2A:
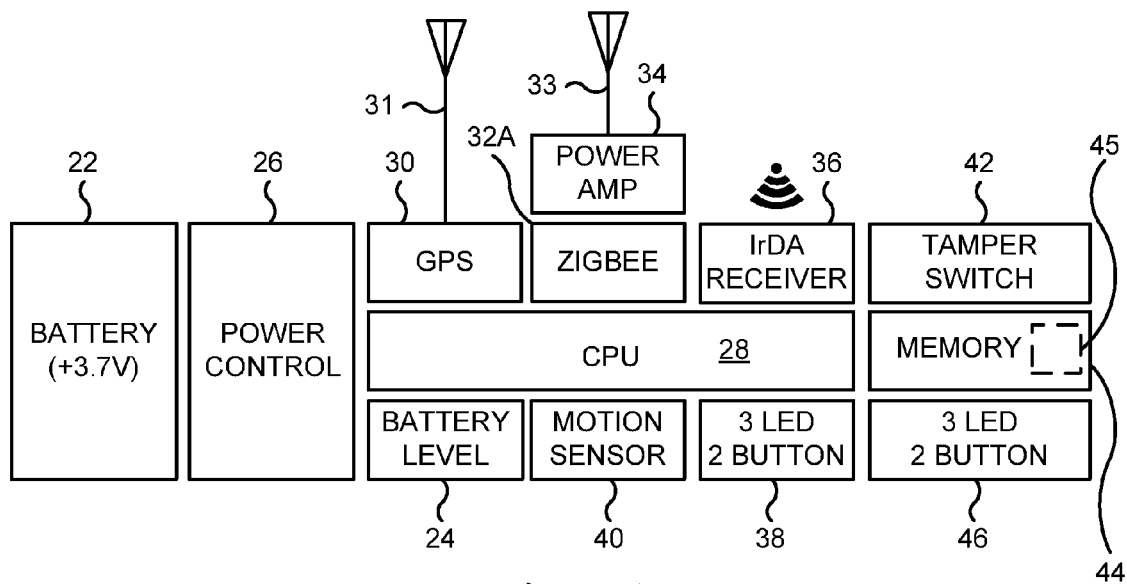
FIG. 2A is a schematic block diagram of a tracking device according to this disclosure.
Figure 2B:
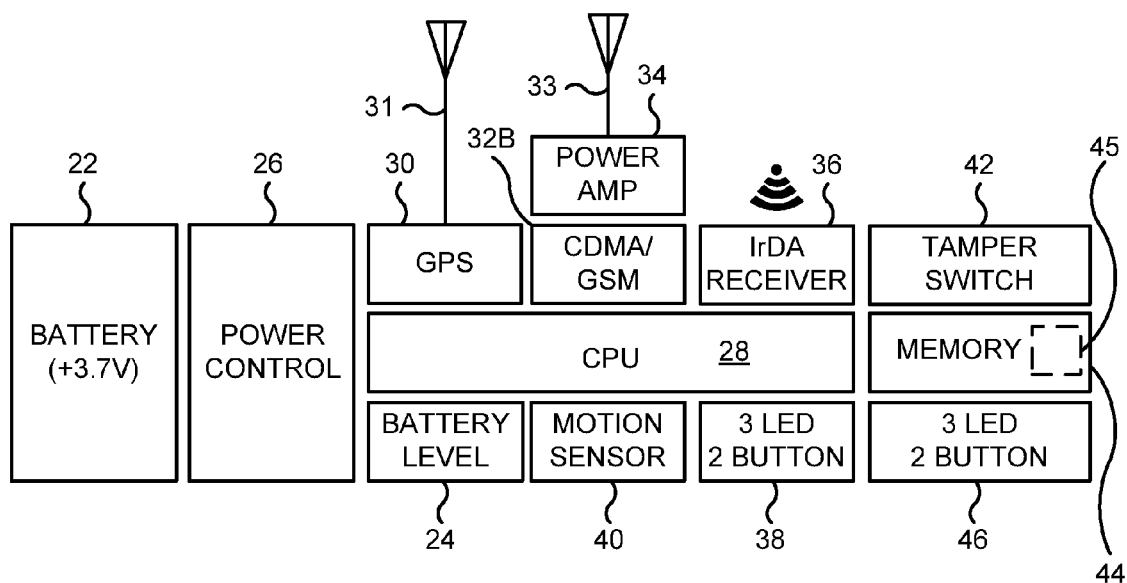
FIG. 2B is a schematic block diagram of an alternate tracking device according to this disclosure.

FIGS. 2A and 2B illustrate two embodiments of transmitter device 14, as transmitter device 14A and 14B respectively. Each embodiment includes a battery 22, which may be a single use battery or a rechargeable battery. Examples of suitable batteries include NiCad, lithium, lithium-ion, zinc-carbon, and alkaline batteries. In the figures, batteries 22 are identified as a 3.7V battery, although it is understood that other voltage batteries 22 could be used. Electrically connected to battery 22 is a battery level monitor 24 and a power control 26, which in turn is operably connected to a computer chip or CPU 28. Transmitter device 14 also includes a positioning element, in these embodiments a GPS positioning element 30 connected to an antenna 31, which may be an internal antenna or an external antenna. Positioning element 30 provides data to transmitter device 14A, 14B regarding its physical location. When device 14A, 14B transmits data (i.e., pings), this location can then be transmitted to display 18.

In some embodiments, transmitter device 14 has two-way communication with receiver 16. That is, transmitter device 14 transmits information and also receives information from receiver 16. Transmitter device 14 transmits information, such as location, to display 18. Further, transmitter device 14 receives instructions, such as to acknowledge that device 14 is active and ready and to transmit the location information. Having received those instructions, device 14 can send back to receiver 16 acknowledgement that the communication was received and acted on.

The two embodiments of FIGS. 2A and 2B differ only in that device 14A of FIG. 2A includes a ZigBee module 32A, configured to connect to receiver 16 via a ZigBee network 20 and communicate data to display 18, whereas device 14B of FIG. 2B includes a CDMA (Code Divisional Multiple Access) and/or GSM (Global System for Mobile Communication) module 32B, configured to connect to receiver 16 via either a CDMA or GSM network 20 and communicate data to display 18. Modules 32A, 32B each have an antenna 33, which may optionally include a power amplifier 34 to extend the range of the signal from module 32A, 32B. It is these modules 32A, 32B that provide the communication basis for transmitter device 14 to display 18.

An alternate embodiment of a transmitter device can include both a ZigBee module 32A and a CDMA and/or GSM module 32B.

Additionally, transmitter devices 14A, 14B may include a data receiver 36, such as an infra red data link (IrDA), to provide a second communication means to device 14A, 14B, as an alternate or back-up to module 32A, 32B. IrDA 36 includes an optical window formed from an IR transparent material, such as glass, to allow infra red radiation or energy to pass to and from IrDA 36.

An audio alarm 38 is included, to indicate any number of problems or malfunctions, such as low battery level, unauthorized movement (as sensed by motion sensor 40), or tampering with device 14A, 14B (as sensed by switch 42).

Any of the data or information regarding devices 14A, 14B, such as it's position as determined by positioning element 30, alarm information, battery level information, and ping information, etc., can be stored in memory 44 of device 14A, 14B, which may be a permanent memory or a rewritable memory. Devices 14A, 14B also include various operational switches and buttons 46, in these embodiments, 3 LED lights and 2 button.

The various elements that compose transmitter device 14A, 14B may be housed in an RF transmissive case, preferably one which is at least water resistant.

The effectiveness of tracking system 10 to track and/or locate asset 12 is directly impacted by the life of the power source (i.e., battery) that provides transmitter device 14 (e.g., transmitter device 14A, 14B) with the energy to perform its function, which includes sending its 'ping'. The expectation with these tracking systems 10, and particularly transmitter device 14, is to have autonomous operation for extended periods of time, such as days, weeks, and sometimes even months. An active RF tag or transmitter device 14 actively transmits its location or other data at a predetermined point in time to receiver 16. Although each data transmission or ping from transmitter device 14 uses very little power from the self-contained battery, over extended periods of time, such as days, weeks, and sometimes even months, the battery is drained of power, resulting in a poorly functioning or non-functioning transmitter which could result in a lost tagged asset. To reduce the opportunity of a poorly functioning or non-functioning transmitter, the transmitter undergoes battery maintenance or replacement, which increases operational expenses.

The active RF tracking system 10 of the present disclosure increases the value per ping by basing the ping rate and ping occurrence on a predetermined probably of motion of the tagged asset and/or probability of a desired event. The ping rate is higher when there is a higher probability of an occurrence of an exception event and lower when there is a lower probability of an occurrence of an exception event.

An exception event is an event of interest, such as a business event such as moving the asset (for example, from a manufacturing or packaging area to a warehouse area), loading of the asset (for example, into a truck), unloading of the asset, or another event of interest, such as a predicted loss or possible loss of RF signal (for example, in a location known to have poor or no RF signal transmission, such as within a tunnel or other RF shielded area), a sudden change of temperature (either increase or decrease), sudden change in motion (acceleration, deceleration, or stop), and the like. In the system of this disclosure, these exception events are predetermined or learned over time and are stored in a database, such as a "Route Exception Dictionary" database. The "Route Exception Dictionary" database may be stored in memory 44 of transmitter 14A, 14B or may be stored at a remote location; an exemplary database 45 is shown in FIGS. 2A, 2B in memory 44. In this database, every known exception event is correlated to a particular physical location where the event has previously occurred.

Figure 3A:
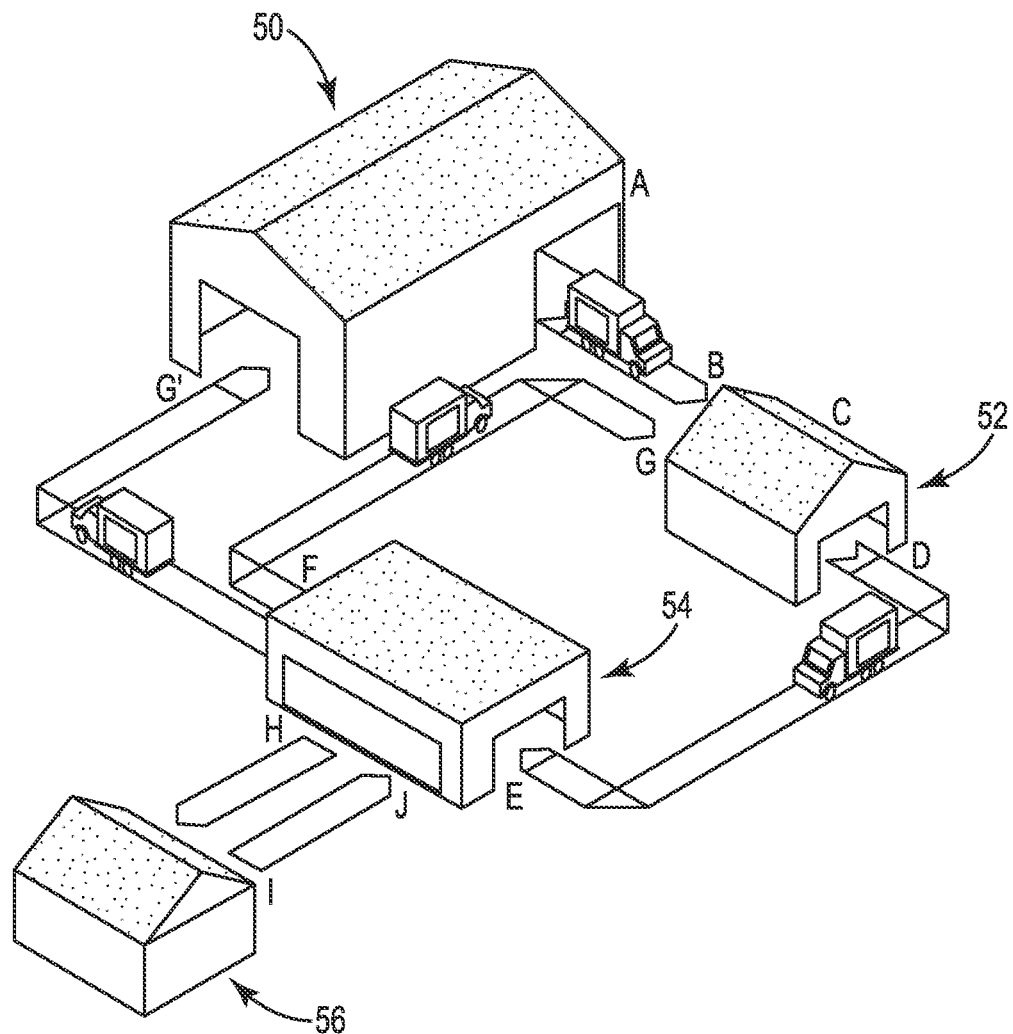
FIG. 3A is a schematic rendering of a route taken by a tagged asset.

FIG. 3A illustrates one embodiment of a route of an asset being tracked; the route includes several exception events. In this embodiment, pallet 13 of asset 12 has transmitter device 14 thereon, thus, it is the movement of pallet 13 that is being tracked. In FIG. 3A, the pallet tagged with the transmitter device begins in a warehouse or pallet service center 50. Typically, at this stage, the pallet is bare or empty, not having any goods loaded thereon. The pallet is loaded onto a truck or other vehicle, which is a first exception event A. From center 50, the pallet is moved to a manufacturing facility 52, where it is unloaded at a loading dock; the unloading of the tagged pallet from the truck is a second exception event B. At manufacturing facility 52, goods are placed onto the tagged pallet and moved from the production floor to a storage location, which is a third exception event C. Loading the loaded pallet from the storage location onto a truck or other vehicle is a fourth exception event D. The tagged pallet is moved to a distribution center 54, again where it is unloaded at a loading dock; the unloading of the tagged pallet from the truck at center 54 is a fifth exception event E. At distribution center 54, the pallet may be unloaded and its goods transferred to other pallet(s) or placed in storage, or the goods may remain on the tagged pallet. If unloaded, the tagged pallet may be transferred back to center 50 or to manufacturing facility 52; placing the empty pallet onto the vehicle for transport is an exception event F and removing the pallet from the vehicle at the destination is another exception event G or G'. If the tagged pallet remains loaded, the pallet may be sent to a retail outlet 56 and unloaded there. Placing the full pallet onto the vehicle for transport to retail outlet 56 is an exception event H, receipt at retail outlet 56 is an exception event I, and returning the pallet to distribution center 54 is another exception event J.

Figure 3B:
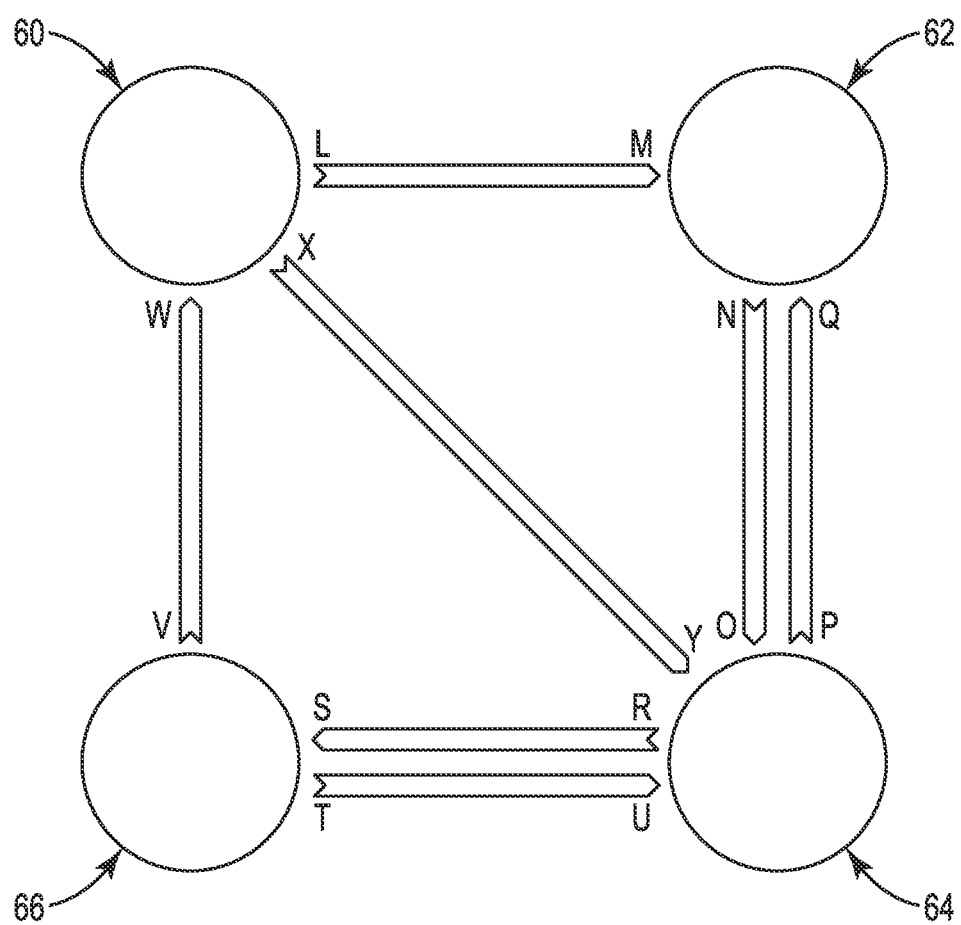
FIG. 3B is a block diagram of a route taken by a tagged asset.

FIG. 3B illustrates another embodiment of a route of an asset being tracked; the route includes several exception events. In this embodiment, pallet 13 of asset 12 again has transmitter device 14 thereon, thus, it is the movement of pallet 13 that is being tracked. As in FIG. 3A, in FIG. 3B an empty pallet tagged with the transmitter device begins in a warehouse or pallet service center 60, which is a first exception event L. From center 60, the pallet is moved to a manufacturing facility 62, where it is unloaded at a loading dock; the unloading of the tagged pallet from the truck is a second exception event M. At manufacturing facility 62, goods are placed onto the tagged pallet (exception event N) and the loaded pallet is moved to a distribution center 64, where it is unloaded at a loading dock for exception event O. At distribution center 64, the pallet may be unloaded and its goods transferred to other pallet(s) or placed in storage, or the goods may remain on the tagged pallet. If unloaded, the tagged pallet may be transferred back to manufacturing facility 52 (exception events P and Q). If loaded, the tagged pallet may be transferred to retail outlet 66 (exception events R and S). Unloaded at retail outlet 66, the pallet may be returned to distribution center 64 (exception events T and U) or to pallet service center 60 (exception events V and W). From center 60, the pallet may again be sent to manufacturing facility 62 (exception events L and M) or may go to distribution center 64 (exception events X and Y).

Although various exception events have been identified in the above scenarios, it is understood that other actions within the scenarios could be identified as exception events, or that some actions identified above may be removed as exception events. For example, in the scenario of FIG. 3B, the loading of the pallet onto a truck may be an exception event as well as the truck leaving the loading dock. Movement of the pallet within a facility (e.g., within distribution center 54, 64) may be an exception event.

Because the routes described in relation to FIGS. 3A and 3B are common routes and the scenarios have previously occurred, the location and approximate time occurrence of the exception events is known. The location and approximate time of exception events is entered and saved in the Route Exception Dictionary database of the tracking system. It is at or close to these exception events that transmitter device 14 will ping receiver 16, indicating its location and/or other information.

As will be appreciated by one of skill in the art, the invention of the present disclosure may be embodied as a method, system, computer program product, or a combination thereof. Accordingly, the invention of the present disclosure may take the form of an entirely hardware embodiment, an entirely software embodiment (including firmware, resident software, micro-code, etc.) or an embodiment combining software and hardware aspects that may generally be referred to herein as a "system." Furthermore, the invention of the present disclosure may take the form of a computer program product on a computer-usable storage medium having computer-usable program code embodied in the medium.

Any suitable computer usable or computer readable medium may be utilized with computer 18 (FIG. 1). In the context of this disclosure, a computer usable or computer readable medium may be any medium that can contain, store, communicate, propagate, or transport the program for use by or in connection with the instruction execution system, platform, apparatus, or device. The computer usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, radio frequency (RF) or other means.

Computer program code for carrying out operations of the invention of the present disclosure may be written in an object oriented, scripted or unscripted programming language such as Java, Perl, Smalltalk, C++ or the like, or may be written in conventional procedural programming languages, such as the "C" programming language or similar programming languages.

The invention of the present disclosure is described below with reference to flowchart illustrations and/or block diagrams of the methods, apparatus (systems) and computer program products according to embodiments of the disclosure. It will be understood that each block of the flowchart and/or block diagram, and combinations of blocks, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instruction means which implement the function/act specified in the flowchart and/or block diagram block or blocks. The computer program instructions may also be loaded onto a computer or other programmable data processing apparatus to cause a series of operations to be performed on the computer or other programmable apparatus to produce a computer implemented process such that the instructions which execute on the computer or other programmable apparatus provide steps for implementing the functions/acts specified in the flowchart and/or block diagram block or blocks. Alternatively, computer program implemented steps or acts may be combined with operator or human implemented steps or acts in order to carry out an embodiment of the invention.

Returning to FIGS. 3A and 3B, prior to the first exception event (i.e., exception event A and exception event L), transmitter device 14 may be in a 'reset mode', not yet having been activated. Upon activation or 'reset', transmitter device 14 activates and attempts to send a ping to receiver 16 to identify that transmitter device 14 is alive. If a wireless communication mechanism (such as, e.g., CDMA/GMA or ZigBee) is unavailable or not found, the ping or message is saved in an internal memory of transmitter device 14 for later transmission. After the initial ping is sent, transmitter device 14 sits in an idle mode.

Figure 4:
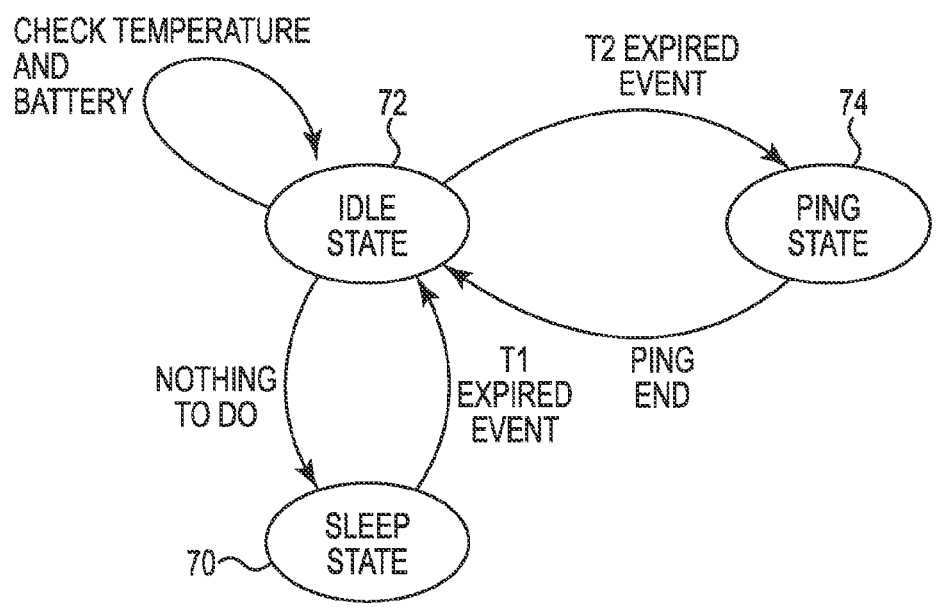
FIG. 4 is a block diagram showing initial actions by the system of this disclosure.

As indicated above, the tracking system utilizes a time-based ping. FIG. 4 shows a state diagram of this time-based ping. Initially, transmitter device 14 is in a reset mode, sleep mode or sleep state 70. Upon activation or after expiration of a predetermined time period T1, transmitter device 14 will go to idle mode or state 72. Transmitter device 14 will remain in this idle state 72 until a second time period T2 has lapsed, at which time transmitter device 14 will switch to a ping mode or state 74 and send at least one ping to receiver 16. After the ping(s) have been sent and acknowledged, transmitter device 14 returns to its idle state 72. While in idle state 72, transmitter device 14 can perform self-tests, such as checking its battery life or its temperature. After a predetermined period in idle state 72, transmitter device 14 will return to its sleep state 70.

Figure 5:
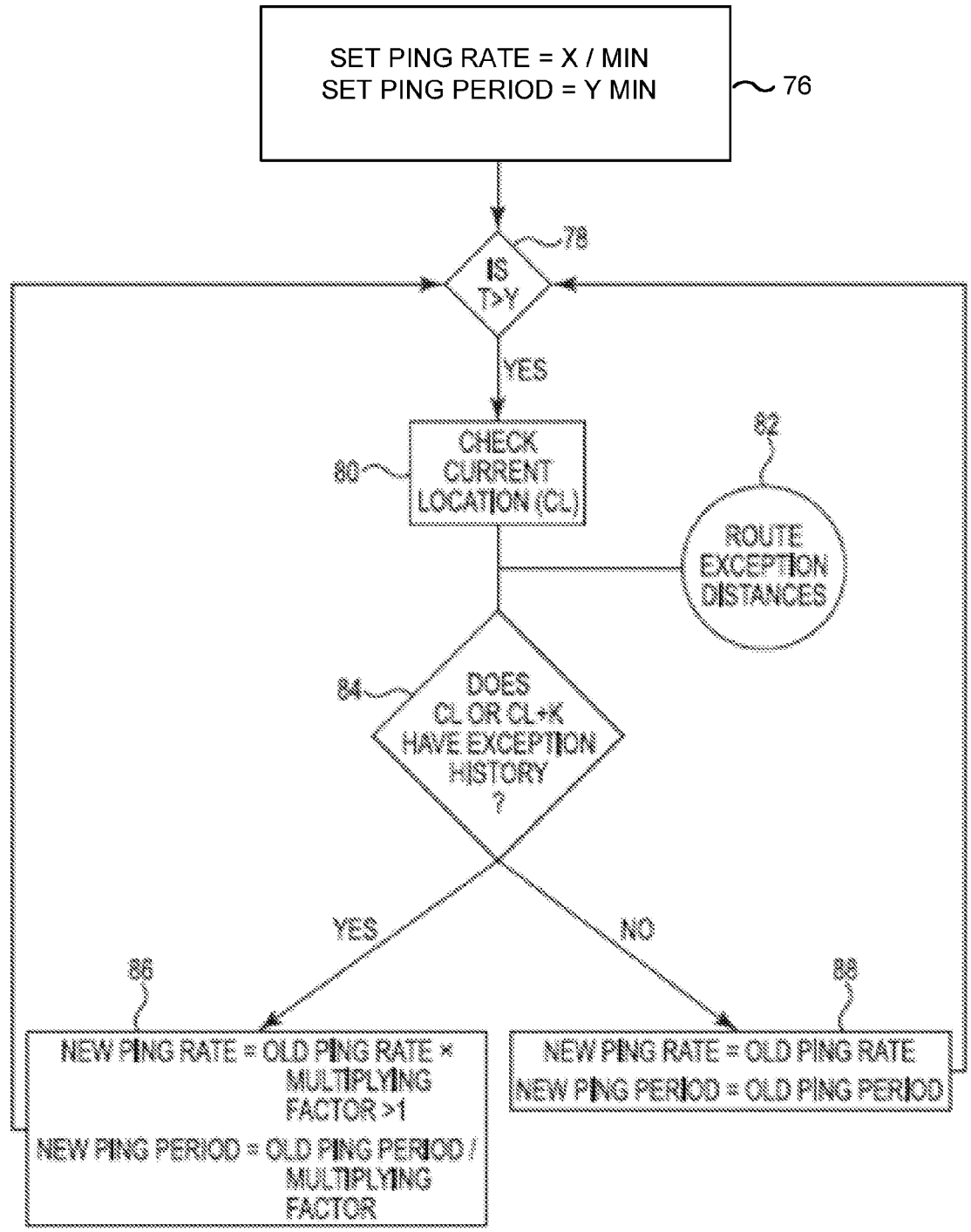
FIG. 5 is a flow chart of a process for tracking an RF tagged asset according to an embodiment of the present disclosure.

FIG. 5 shows a logic flowchart for system 10 of FIG. 1 and of this disclosure and its intelligent adjustment of the ping rate. Initially, prior to tracking asset 12, the ping rate and the ping period for the system are pre-set at step 76; in FIG. 5, the ping rate is set at X pings per minute and the ping period is set for Y minutes. Non-limiting examples of X include 1 and 2, and non-limiting examples of Y include 5, 10, 15 and 30. After initiating system 10 (e.g., removing transmitter device 14 from its sleep state), system 10 monitors the time "t" (in this embodiment, in minutes, although other periods of time, such as hours or days could be used). It is noted that t=Y is the same as T2 from FIG. 4. If system 10 determines that time "t" is greater than Y (at step 78), transmitter device 14 sends at least one ping to receiver 16 to identity its current location (CL) (step 80). Computer 18 checks the "Route Exception Dictionary" database 82 for any entries of an exception event at that current location (CL) or within a predetermined distance (K) of that location (CL). The distance (K) may be the same for each exception event, but in most embodiments, the distance (K) will vary, depending on the nature of the event. For example, referring to FIG. 3A, the distance (K) between exception event B and exception event C may be a few feet, whereas distance (K) between exception event D and exception event E may be a mile or more.

Returning to FIG. 5 to step 84, if there is a past exception event associated with that particular location (CL) or within the predetermined distance (K) of that location (CL), the ping rate is then increased by a predetermined multiplying factor greater than 1 (e.g., 1.2, 1.5, 2, 2.5, etc.) in step 86. The thus increased ping rate provides a more accurate and precise identification of the location of the tagged assets. However, the increased ping rate will drain the battery at a faster rate. Thus, the system of this disclosure, if the ping rate is increased, will conversely reduce the ping period by the same or similar multiplicative factor, in order to balance the increased rate; the total number of pings over a duration of time is thus maintained constant or close to constant. In some embodiments, the total number of pings for the adjusted rate and period (i.e., new ping rate×new ping period) is the same as or lower than a conventional or un-compensated methodology. If no past exception event is within the predetermined distance (K) of the location (CL), the ping rate and ping period remain the same (step 88) until another time period "t" has lapsed.

In such a manner, the tracking systems of this disclosure produce an active ping based on a predetermined event. By intelligently selecting the occurrence of the pings, the system has an increased value per ping, focusing the pings around events of importance to the asset, and extending battery life.

By using the methodology of the system of this disclosure, i.e., increasing the ping rate yet decreasing the ping period when an exception event is expected based on previous history, and decreasing the ping rate or keeping a low ping rate when no exception event is expected, the overall total number of pings can be adjusted to prolong battery life while maintaining accurate tracking of the asset.

By associating the ping rate with a predetermined exception event, each ping is more relevant and effective than for systems which randomly and/or continuously ping. The technique of the system of this disclosure provides a significant benefit when the asset route is known and the "Route Dictionary" has a well established and/or rich knowledge repository of exception events.

With continuous use of the tracking system, the system improves and gets more accurate. In some embodiments, every time an exception event is encountered, the ping rate and/or ping period are adjusted. In some embodiments, when a new exception event encountered, the ping rate and/or period are adjusted to compensate for the new exception.

Thus, embodiments of the ASSET TRACKING SYSTEM WITH ADJUSTED PING RATE AND PING PERIOD are disclosed. The implementations described above and other implementations are within the scope of the following claims. One skilled in the art will appreciate that the present invention can be practiced with embodiments other than those disclosed. The disclosed embodiments are presented for purposes of illustration and not limitation, and the present invention is limited only by the claims that follow.

What is claimed is:
1. An RF tracking system comprising:
a tracking device comprising a battery, a GPS positioning element, a two-way communication module, and memory;
a route exception database comprising a plurality of exception event locations; and
a receiver device; the tracking device configured to send data regarding the location of the tracking device to the receiver device, and the receiver device configured to receive the data from the tracking device;
wherein the tracking device is configured to modify a ping rate and a ping period at which the data is sent by the tracking device based on a distance between the location of the tracking device and an exception event location from the database.

2. The tracking system of claim 1 wherein the communication module is a ZigBee, communication module.

3. The tracking system of claim 1 wherein the communication module is a CDMA and/or GSM communication module.

4. The tracking system of claim 1 wherein the route exception database is stored in the tracking device memory.

5. The tracking system of claim 1 wherein the tracking device further comprises a data receiver component.

6. The tracking system of claim 5 wherein the data receiver component is an infrared data link.

7. The tracking system of claim 1 wherein the tracking device is further configured to send acknowledgement to the receiver device that the tracking device is available.

8. The tracking system of claim 1 wherein the battery is a rechargeable battery.

9. A method of tracking an asset with a tracking device operably attached thereto, the tracking device having a positioning unit and a central processing unit (CPU), the method comprising:
setting an initial ping rate of the tracking device;
determining a location of the tracking device via the positioning unit;
checking a route exception database for an exception event within a predetermined distance of the location via the CPU;
increasing the initial ping rate via the CPU to a new ping rate if the exception event is within the predetermined distance of the location; and
transmitting a plurality of pings from the tracking device at the new ping rate.

10. The method of claim 9, wherein the initial ping rate is increased by a multiple of at least 1.2 to obtain the new ping rate.

11. The method of claim 9, wherein the initial ping rate is increased by a multiple of at least 1.5 to obtain the new ping rate.

12. The method of claim 9 further comprising:
setting an initial ping period;
decreasing the initial ping period to a new ping period if the exception event is within the predetermined distance of the location; and
transmitting a plurality of pings for the new ping period.

13. The method of claim 12, wherein the initial ping period is decreased by a multiple of at least 1.2 to obtain the new ping rate.

14. The method of claim 12, wherein the initial ping rate is increased by a multiple and the initial ping period is decreased by the same multiple to obtain the new ping rate.

15. The method of claim 9 wherein the exception event is identified by time.

16. The method of claim 9 wherein the exception event is identified by location.

17. A method of tracking an asset with a tracking device operably attached thereto, the tracking device having a positioning unit and a central processing unit (CPU), the method comprising:
determining a location of the tracking device via the positioning unit;

checking a route exception database via the CPU for an exception event within a predetermined time of the location;

increasing a ping rate of the tracking device via the CPU to a new ping rate if the exception event is within the predetermined time of the location; and transmitting a plurality of pings from the tracking device at the new ping rate.

18. The method of claim 17 wherein the exception event is identified by time.

19. The method of claim 17 wherein the exception event is identified by location.

* * * * *